(12) United States Patent
Jo et al.

(10) Patent No.: US 12,320,960 B2
(45) Date of Patent: Jun. 3, 2025

(54) LENS ASSEMBLY AND CAMERA MODULE INCLUDING THE SAME

(71) Applicant: SAMSUNG ELECTRO-MECHANICS CO., LTD., Suwon-si (KR)

(72) Inventors: Yong Joo Jo, Suwon-si (KR); Do Hyeong Jang, Suwon-si (KR); Byung Hyun Kim, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 530 days.

(21) Appl. No.: 17/729,298

(22) Filed: Apr. 26, 2022

(65) Prior Publication Data
US 2022/0390716 A1 Dec. 8, 2022

(30) Foreign Application Priority Data

Jun. 2, 2021 (KR) .................. 10-2021-0071786
Dec. 28, 2021 (KR) .................. 10-2021-0190120

(51) Int. Cl.
*G02B 13/00* (2006.01)
*G02B 7/02* (2021.01)
(Continued)

(52) U.S. Cl.
CPC ......... *G02B 13/0045* (2013.01); *G02B 7/021* (2013.01); *H04N 23/51* (2023.01); *H04N 23/54* (2023.01); *H04N 23/55* (2023.01)

(58) Field of Classification Search
CPC .... G02B 13/0045; G02B 7/021; G02B 27/64; G02B 27/646; G02B 3/00; G02B 3/0006; G02B 3/0037; G02B 3/005; G02B 3/0056; G02B 3/0062; G02B 6/0068; G02B 3/0075; G02B 2003/0093; G02B 9/34;
(Continued)

(56) References Cited

U.S. PATENT DOCUMENTS 5,461,444 A  10/1995 Okura et al.
9,955,053 B2* 4/2018 Lu ..................... H04N 23/45
(Continued)

FOREIGN PATENT DOCUMENTS

CN  101452105 A  6/2009
CN  102131044 A  7/2011
(Continued)

OTHER PUBLICATIONS

Taiwanese Office Action issued on Feb. 15, 2023, in counterpart Taiwanese Patent Application No. 111116691 (11 pages in English, 15 pages in Chinese).
(Continued)

*Primary Examiner* — Arnel C Lavarias
(74) *Attorney, Agent, or Firm* — NSIP Law

(57) ABSTRACT

A lens assembly includes a plurality of lens arrays sequentially disposed from an object side toward an image side, wherein each lens array includes a plurality of lenses, and a plurality of lenses included in a lens array of the plurality of lens arrays, disposed to be closest to the image side have a length in a first axis direction, perpendicular to an optical axis, longer than a length in a second axis direction, perpendicular to both the optical axis and the first axis direction.

22 Claims, 20 Drawing Sheets

(51) Int. Cl.
*H04N 23/51* (2023.01)
*H04N 23/54* (2023.01)
*H04N 23/55* (2023.01)

(58) Field of Classification Search
CPC .......... G02B 9/60; H04N 23/51; H04N 23/54; H04N 23/55; H04N 23/68; H04N 23/682; H04N 23/685; H04N 23/687; H04N 5/23248; H04N 5/23264; H04N 5/2328; H04N 5/23287; G03B 2217/005; G03B 2205/00; G03B 2205/0007; G03B 2205/0015
USPC ....... 359/557, 554, 618, 619, 621, 622, 623, 359/624, 628, 642, 771, 772, 773, 763, 359/764, 766; 250/201.1, 201.2, 201.4; 348/208.99, 208.2, 208.12; 396/52, 55
See application file for complete search history.

(56) References Cited

U.S. PATENT DOCUMENTS

| | | |
|---|---|---|
| 10,063,756 B2 | 8/2018 | Kim et al. |
| 10,938,464 B1 | 3/2021 | Jeong et al. |
| 2010/0165134 A1 | 7/2010 | Dowski, Jr. et al. |
| 2011/0176020 A1 | 7/2011 | Chang |
| 2011/0194019 A1 | 8/2011 | Shyu et al. |
| 2013/0235479 A1 | 9/2013 | Oi et al. |
| 2013/0287383 A1 | 10/2013 | Haruguchi et al. |
| 2015/0215505 A1 | 7/2015 | Lu et al. |
| 2018/0180836 A1 | 6/2018 | Huang |
| 2019/0179103 A1 | 6/2019 | Yang et al. |
| 2021/0003911 A1* | 1/2021 | Ooi ............... G02B 3/0056 |
| 2022/0357547 A1 | 11/2022 | Kang et al. |

FOREIGN PATENT DOCUMENTS

| | | |
|---|---|---|
| CN | 102375199 A | 3/2012 |
| CN | 101473439 B | 3/2013 |
| CN | 105093472 A | 11/2015 |
| CN | 109917528 A | 6/2019 |
| CN | 115291351 A | 11/2022 |
| JP | H07-5353 A | 1/1995 |
| JP | 2013-228610 A | 11/2013 |
| JP | 2015-36794 A | 2/2015 |
| KR | 10-2016-0103541 A | 9/2016 |

OTHER PUBLICATIONS

Chinese Office Action issued on Mar. 31, 2025, in corresponding Chinese Patent Application No. 202210597801.5. (5pages in English, 8pages in Chinese).

* cited by examiner

LENS ASSEMBLY AND CAMERA MODULE INCLUDING THE SAME

CROSS-REFERENCE TO RELATED APPLICATIONS

This application claims the benefit under 35 USC 119(a) of Korean Patent Application No. 10-2021-0071786 filed on Jun. 2, 2021, and Korean Patent Application No. 10-2021-0190120 filed on Dec. 28, 2021, in the Korean Intellectual Property Office, the entire disclosures of which are incorporated herein by reference for all purposes.

BACKGROUND

1. Field

The present disclosure relates to a lens assembly and a camera module including the same.

2. Description of the Background

Recently, camera modules have been employed in portable electronic devices such as smartphones, tablet PCs, and notebook computers.

In addition, in recent years, the number of pixels of image sensors has increased and the size of the image sensors themselves has also increased in order to capture a high-resolution image or video. In addition, the number of lenses has also increased.

Due to this, the size of camera modules increases to cause a problem that the camera modules protrude from portable electronic devices.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a lens assembly includes a plurality of lens arrays sequentially disposed from an object side toward an image side, wherein each lens array includes a plurality of lenses, and a plurality of lenses included in a lens array of the plurality of lens arrays disposed to be closest to the image side have a length in a first axis direction, perpendicular to an optical axis, longer than a length in a second axis direction, perpendicular to both the optical axis and the first axis direction.

The plurality of lens arrays may include a first lens array and a second lens array, a protrusion may be disposed in any one of the first lens array and the second lens array and a recess may be disposed in the other thereof, and the protrusion and the recess may be in contact with each other to be coupled.

A surface in which the protrusion and the recess face each other in a direction perpendicular to the optical axis may be an inclined curved surface.

The protrusion may have a truncated cone shape.

The protrusion and the recess may be gradually reduced in diameter in a direction from the protrusion to the recess.

A height of the protrusion may be greater than a depth of the recess.

The protrusion and the recess may each be positioned in a region surrounded by the plurality of lenses.

In the plurality of lenses included in the lens array disposed closest to the image side, side surfaces facing each other in the second axis direction may have a linear shape when viewed in an optical axis direction.

In the plurality of lenses included in the lens array disposed closest to the image side, a ratio of a length in the second axis direction to a length in the first axis direction may be greater than 0.5 and less than 1.

In a plurality of lenses included in a lens array of the plurality of lens arrays, disposed to be adjacent to the lens array disposed closest to the image side, a length in the first axis direction may be longer than a length in the second axis direction.

In a plurality of lenses included in a lens array of the plurality of lens arrays, disposed closest to the object side, an object-side surface may be convex.

The plurality of lenses included in the lens array disposed closest to the object side may have a positive refractive power.

In another general aspect, a camera module includes a plurality of lens modules each including a plurality of lenses and disposed to be adjacent to each other, a housing accommodating the plurality of lens modules, and an image sensor module coupled to the housing and having a single image sensor, wherein the image sensor has a longer side extending in a first axis direction, perpendicular to an optical axis, and a shorter side extending in a second axis direction, perpendicular to both the optical axis and the first axis direction, and lenses disposed to be closest to an image side, among the plurality of lenses included in each lens module, have a length in the first axis direction longer than a length in the second axis direction.

The lenses disposed closest to the image side may include at least one of side surfaces facing each other in the first axis direction and the second axis direction having a linear shape when viewed in an optical axis direction.

The lenses disposed closest to the image side may include an optical portion and a flange portion extending from the optical portion, and the optical portion may include a first edge having an arc shape, a second edge provided on the opposite side from the first edge based on the optical axis and having an arc shape, and third and fourth edges connecting the first edge and the second edge, when viewed in an optical axis direction.

At least one of the third edge and the fourth edge may have a linear shape when viewed in the optical axis direction.

Lenses, among the plurality of lenses included in each lens module, disposed to face the lenses disposed closest to the image side, may have a length in the first axis direction longer than a length in the second axis direction.

The camera module may further include a single infrared cut-off filter disposed between the plurality of lens modules and the image sensor, and the light blocking portion may divide the infrared cut-off filter into a plurality of regions to correspond to the number of the plurality of lens barrels.

In another general aspect, a camera module includes an array of a plurality of lens modules, wherein each lens module comprises lenses sequentially disposed from an object side toward an image side, wherein an image side most lens of each lens module comprises a length in a first axis direction, perpendicular to an optical axis, longer than a length in a second axis direction, perpendicular to both the optical axis and the first axis direction.

The array of the plurality of lens modules may include a plurality of lens arrays sequentially disposed from an object side toward an image side, the lenses may be disposed in the plurality of lens arrays, and the image side most lenses may be disposed in an image side most lens array of the plurality of lens arrays.

The plurality of lens arrays may include a first lens array and a second lens array, a protrusion may be disposed in the first lens array or the second lens array and a recess may be disposed in the other thereof, and the protrusion and the recess may be in contact with each other to be coupled.

Each lens module of the array of the plurality of lens modules may include a lens barrel, and the lenses of each lens module may be disposed in a respective lens barrel.

The camera module may further include a housing accommodating the array of the plurality of lens modules, and an image sensor module coupled to the housing and having a single image sensor, wherein the image sensor may have a longer side extending in the first axis direction, and a shorter side extending in the second axis direction.

One or more of the lenses disposed on the object side of the image side most lens of each lens module may have a length in the first axis direction longer than a length in the second axis direction.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
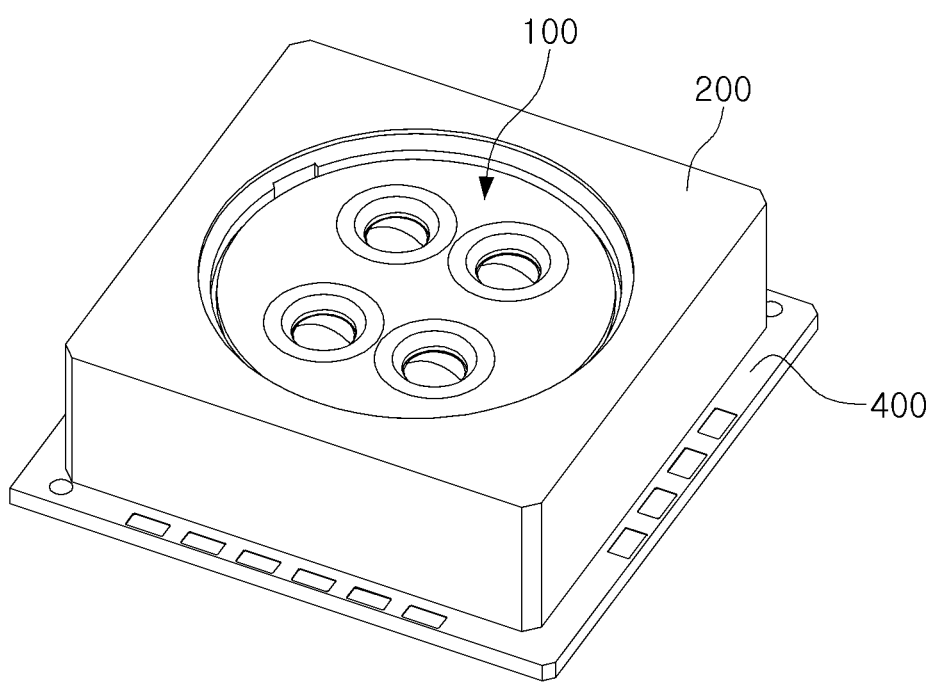
FIG. 1 is a perspective view of a camera module according to an example embodiment in the present disclosure.

Hereinafter, while example embodiments of the present disclosure will now be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

An aspect of the present disclosure may provide a slim lens assembly for capturing a high-resolution image or video, and a camera module including the same.

Figure 2:
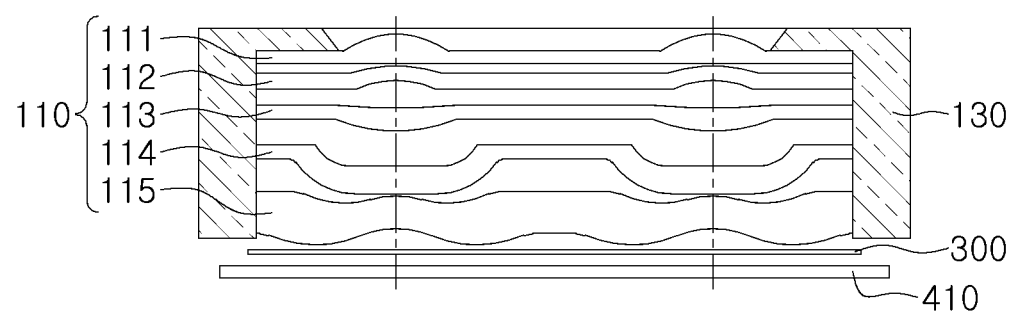
FIG. 2 is a schematic cross-sectional view of a plurality of lens arrays according to an example embodiment in the present disclosure.

FIG. 1 is a perspective view of a camera module according to an example embodiment in the present disclosure, and FIG. 2 is a schematic cross-sectional view of a plurality of lens arrays according to an example embodiment in the present disclosure.

The camera module according to an example embodiment in the present disclosure may be applied to portable electronic devices such as mobile communication terminals, smartphones, and tablet PCs.

Referring to FIGS. 1 and 2, a camera module according to an example embodiment in the present disclosure includes a lens assembly 100, a housing 200, and an image sensor module 400.

The lens assembly 100 includes a plurality of lens arrays 110 and a lens holder 130.

The plurality of lens arrays 110 may be stacked and disposed along an optical axis.

Each of the lens arrays 111, 112, 113, 114, and 115 includes a plurality of lenses.

For example, in each of the lens arrays 111, 112, 113, 114, and 115, a plurality of lenses may be disposed in an N×N matrix structure or an N×M matrix structure. N and M are different natural numbers greater than or equal to 2.

The plurality of lens arrays 110 include a plurality of optical axes. For example, when a plurality of lenses are arranged in a 2×2 matrix structure in each of the lens arrays 111, 112, 113, 114, and 115, the plurality of lens arrays 110 include four optical axes. The plurality of optical axes may be disposed in parallel to each other.

A plurality of lenses sharing one optical axis may constitute one lens module. That is, when a plurality of lenses are disposed in a 2×2 matrix structure in each of the lens arrays 111, 112, 113, 114 and 115, the plurality of lens arrays 110 include four lens modules.

An overall focal length deviation of each lens module may be within ±0.03 mm, an angle of view deviation may be within ±3°, and a distortion deviation may be ±3°.

In addition, in each lens module, a ratio (TTL/(2×IMG HT)) of a distance on the optical axis (TTL) from an object side surface of a lens closest to an object side to an image sensor to a diagonal length (2×IMG HT) of an imaging surface (effective imaging area) may be 0.4 or less.

Hereinafter, for convenience of description, an example embodiment in which a plurality of lenses are disposed in a 2×2 matrix structure in each lens array will be described. Also, the plurality of lens arrays may include four or five lens arrays sequentially arranged from the object side.

The lens assembly 100 may be accommodated in the housing 200. The camera module may have a focus adjustment and/or an optical image stabilization (OIS) function.

For example, the lens assembly 100 may be moved in the optical axis direction with respect to the housing 200 to adjust a focus. In addition, the lens assembly 100 may be moved in a direction, perpendicular to an optical axis with respect to the housing 200 to correct a shake. Here, the optical axis direction may refer to a vertical direction in FIG. 1.

To this end, the camera module according to an example embodiment in the present disclosure may further include an actuator for moving the lens assembly 100.

Meanwhile, instead of moving the lens assembly 100 in the optical axis direction for focus adjustment, a separate adjustment lens for focus adjustment may be further provided.

For example, each lens module may implement a focus adjustment function by including an adjustment lens disposed in front of a lens disposed closest to the object side.

The image sensor module 400 may be coupled to the housing 200. The image sensor module 400 includes an image sensor 410 and a printed circuit board to which the image sensor 410 is connected. Here, the image sensor 410 is provided as a single image sensor 410.

That is, the lens assembly 100 includes a plurality of lens modules, and the image sensor module 400 does not include a plurality of image sensors corresponding to each lens module, but includes the single image sensor 410.

The plurality of lens modules may capture an image of a subject by dividing an effective imaging area of the single image sensor 410.

The camera module according to an example embodiment in the present disclosure may generate a complete image by synthesizing images captured by a plurality of lens modules.

That is, each lens module may capture an image of the same subject, and the captured images may be synthesized to generate a single complete image having a higher resolution than the individual images.

Recently, in order to capture a high-resolution image or video, the number of pixels of an image sensor has increased and the size of the image sensor has also increased. However, as the size of the lens module as well as the image sensor increases, there is a problem in that the camera module protrudes from a portable electronic device.

However, in the lens assembly 100 according to an example embodiment in the present disclosure, a plurality of relatively small lens modules divide an effective imaging area of the single image sensor 410 having a large size so as to capture an image of a subject and synthesize the captured images, so that the lens assembly 100 may be miniaturized while generating a high-resolution image.

Figure 3:
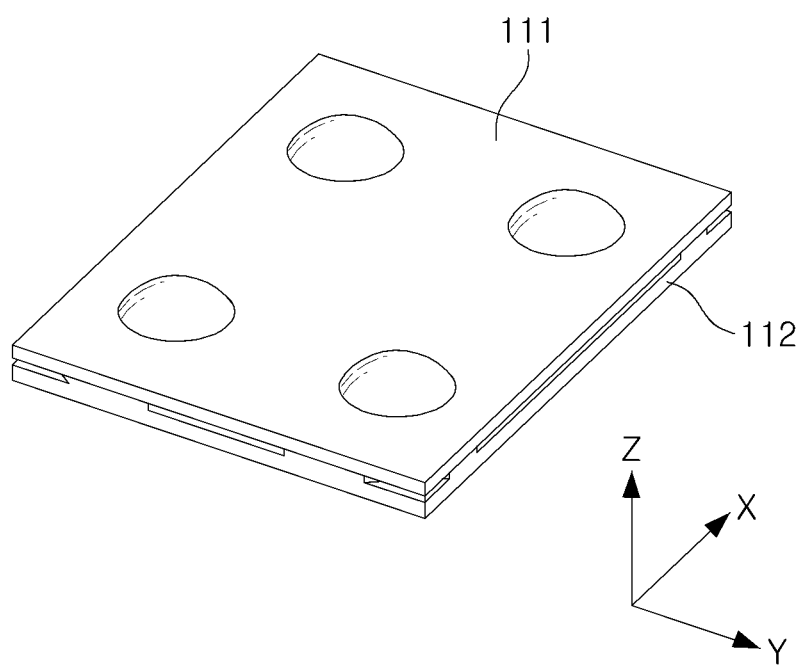
FIG. 3 is a perspective view illustrating a portion of a plurality of lens arrays of a lens assembly according to an example embodiment in the present disclosure.
Figure 4:
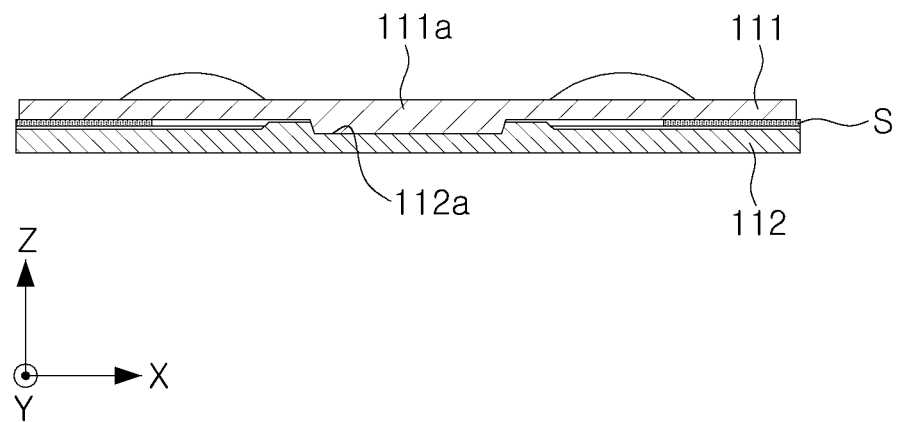
FIG. 4 is a cross-sectional view of FIG. 3.
Figure 5:
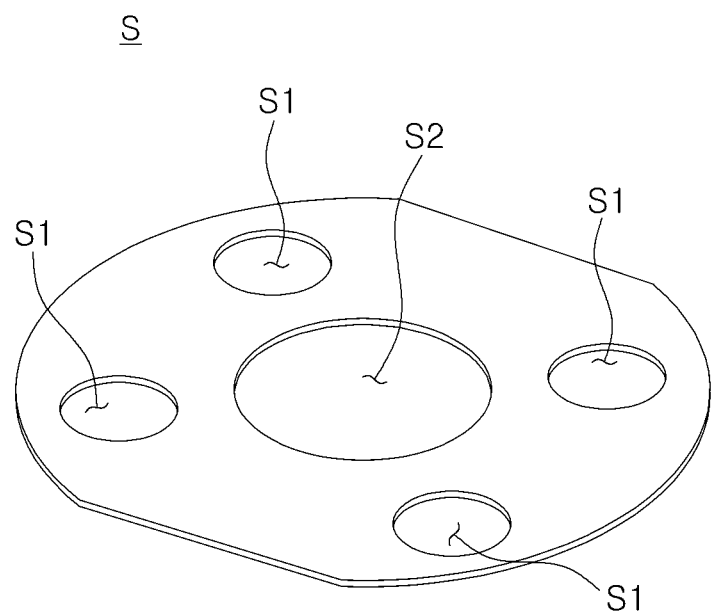
FIG. 5 is a perspective view of a spacer disposed between a plurality of lens arrays.
Figure 6:
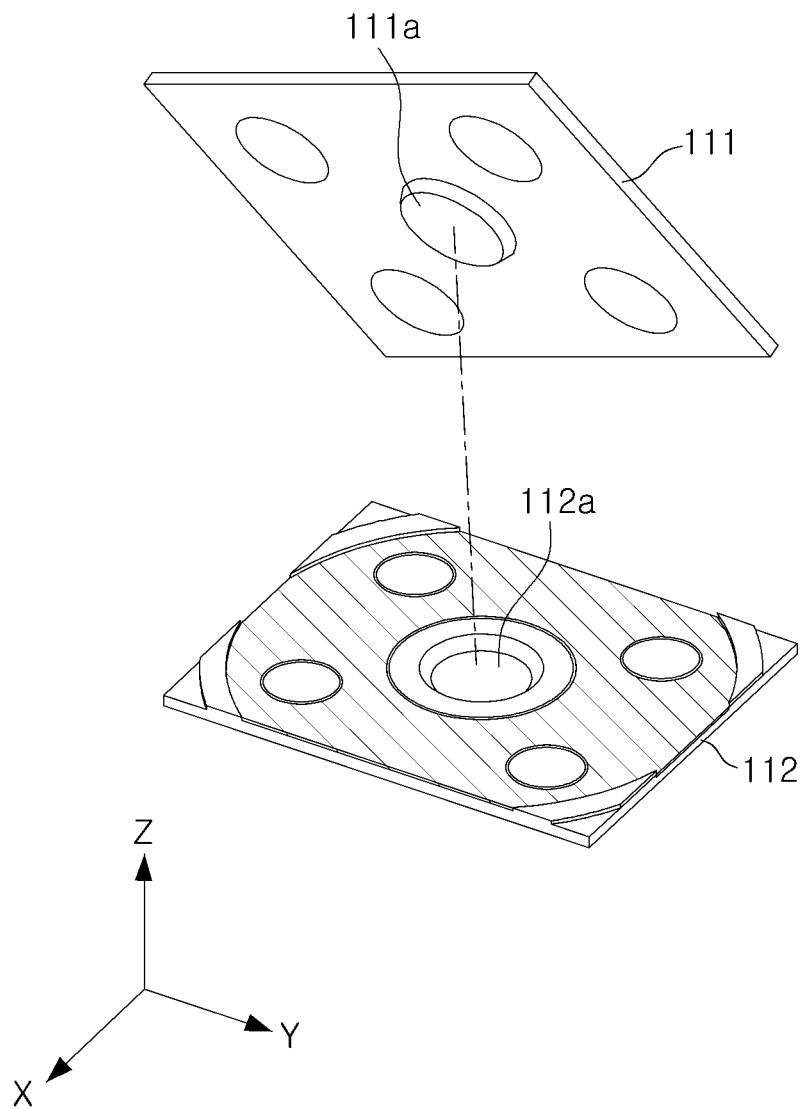
FIG. 6 is an exploded perspective view of FIG. 3.

FIG. 3 is a perspective view illustrating a portion of a plurality of lens arrays of a lens assembly according to an example embodiment in the present disclosure, FIG. 4 is a cross-sectional view of FIG. 3, FIG. 5 is a perspective view of a spacer disposed between the plurality of lens arrays, and FIG. 6 is an exploded perspective view of FIG. 3.

A structure in which a plurality of lens arrays are stacked and disposed in an optical axis direction will be described with reference to FIGS. 3 through 6. Although two lens arrays are illustrated in FIGS. 3 through 6 for convenience, each lens array may be coupled to an adjacent lens array in the form illustrated in FIGS. 3 through 6.

The first lens array 111 and the second lens array 112 may be stacked to be disposed in an optical axis (a Z axis) direction.

Since a plurality of lenses are disposed in each lens array, the first lens array 111 and the second lens array 112 need to be coupled so that the optical axes (the Z axes) of the lenses facing each other in the optical axis (the Z axis) direction are aligned.

Accordingly, the lens assembly 100 according to an example embodiment in the present disclosure has a self-aligning structure so that the optical axes (Z-axes) of the plurality of lens arrays are aligned.

For example, one of the first lens array 111 and the second lens array 112 has a protrusion 111a, and the other has a recess 112a.

In an example embodiment, the protrusion 111a may be disposed on one surface of the first lens array 111 (e.g., a surface facing the second lens array 112), and the recess 112a may be disposed on one surface (e.g., a surface facing the first lens array 111) of the second lens array 112. The protrusion 111a and the recess 112a may be in contact with each other to be coupled.

The first lens array 111 and the second lens array 112 may be coupled to each other by coupling the protrusion 111a and the recess 112a.

In addition, the protrusion 111a and the recess 112a may guide a coupling position of the first lens array 111 and the second lens array 112 so that the optical axes (Z axes) of the plurality of lenses of the first lens array 111 and the plurality of lenses of the second lens array 112 may be aligned with each other.

In a direction from the first lens array 111 to the second lens array 112 (or in a direction from the protrusion 111a to the recess 112a), the protrusion 111a and the recess 112a may each gradually decrease in diameter.

For example, a surface in which the protrusion 111a and the recess 112a face each other in a direction perpendicular to the optical axis (the Z axis) may be an inclined curved surface. That is, a side surface of the protrusion 111a and an inner wall of the recess 112a facing the protrusion 111a may be inclined and curved.

In an example embodiment, the protrusion 111a may have a truncated cone shape, and the recess 112a may have a shape corresponding to the protrusion 111a.

A height of the protrusion 111a may be greater than a depth of the recess 112a. Accordingly, the protrusion 111a and the recess 112a come into contact with each other to be guided in positions along the inclined curved surface, and a remaining area of one surface of the first lens array 111 in which the protrusion 111a is not formed may be disposed to be spaced apart from a remaining portion of the second lens array 112 in which the recess 112a is not formed in the optical axis (the Z axis) direction.

The protrusion 111a and the recess 112a may be positioned in a region surrounded by a plurality of lenses of each lens array. For example, the protrusion 111a and the recess 112a may be disposed at the center of each lens array.

By such a coupling structure, the first lens array 111 and the second lens array 112 may be coupled such that the optical axes (Z axes) of the lenses facing in the optical axis (the Z axis) direction are aligned.

A spacer S may be disposed between the first lens array 111 and the second lens array 112.

The spacer S may maintain a distance between the first lens array 111 and the second lens array 112 and block unnecessary light. For example, a light blocking layer may be provided in the spacer S to block unnecessary light. The light blocking layer may be a black film or black iron oxide.

The spacer S may be formed of a metal material. For example, the spacer S may be formed of a non-ferrous metal. For example, the spacer S may be formed of phosphor bronze.

The spacer S has a plurality of openings S1 so that the plurality of lenses of each lens array may face each other in the optical axis (the Z axis) direction. In addition, the spacer S has a through hole S2 so that the protrusion 111a and the recess 112a are coupled to each other.

Figure 7A:
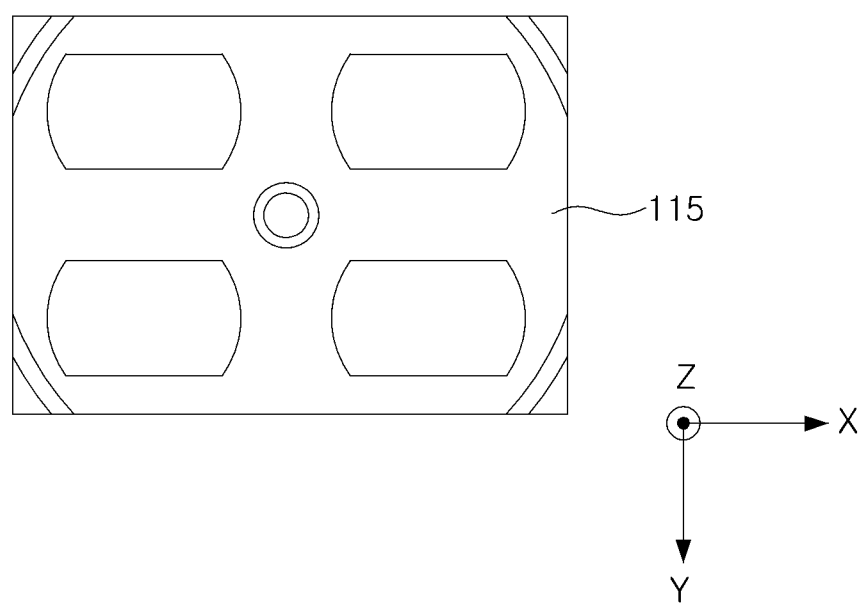
FIGS. 7A and 7B are plan views of some lens arrays.
Figure 7B:
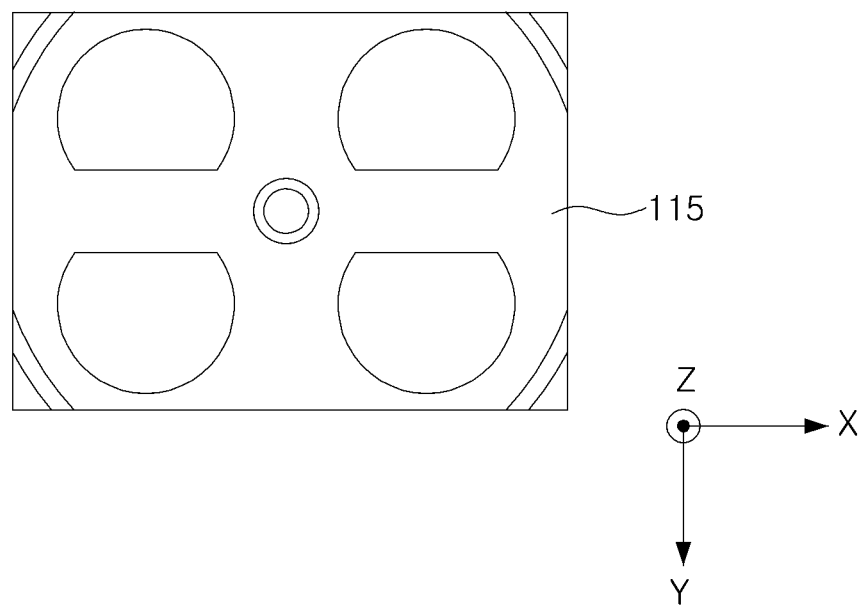

FIGS. 7A and 7B are plan views of some lens arrays.

Referring to FIGS. 7A and 7B, a plurality of lenses disposed in at least one of the plurality of lens arrays 110 may be configured to have a non-circular planar shape.

Since the plurality of lens modules included in the plurality of lens arrays 110 capture an image of the same subject, it is necessary to arrange the optical axes (Z axes) of the respective lens modules as close as possible.

Accordingly, the lens assembly 100 according to an example embodiment in the present disclosure may be configured such that a plurality of lenses disposed in at least one of the plurality of lens arrays 110 have a non-circular planar shape. Herein, planar shape refers to the shape in a plan view.

In an example embodiment, a plurality of lenses included in the first lens array 111 (hereinafter, referred to as 'frontmost lens array') disposed closest to an object side may have a circular planar shape, and a plurality of lenses included in the lens array 115 (hereinafter, referred to as a 'rearmost lens array') disposed closest to an image side may have a non-circular planar shape.

In an example embodiment, a plurality of lenses included in the rearmost lens array and a plurality of lenses included in a lens array (e.g., the fourth lens array 114 from the object side) disposed adjacent to the rearmost lens array 115 may have a non-circular planar shape.

In an example embodiment, the plurality of lenses included in the frontmost lens array may have a circular planar shape, and the plurality of lenses included in the remaining lens arrays may have a non-circular planar shape.

In an example embodiment, the plurality of lenses included in all lens arrays may have a non-circular planar shape.

In all example embodiments, each of the plurality of lenses included in the rearmost lens array has a non-circular planar shape.

By configuring in this manner, the lenses included in the plurality of lens arrays may be disposed close to each other.

Hereinafter, a shape of a plurality of lenses included in the rearmost lens array will be described.

In a plane perpendicular to the optical axis (the Z axis), a length of a non-circular lens in the first axis (the X axis) direction perpendicular to the optical axis (the Z axis) is greater than a length of the non-circular lens in the second axis (the Y axis) direction perpendicular to both the optical axis (the Z axis) and the first axis (the X axis) direction. In the non-circular lens, a ratio of the length in the second axis (the Y axis) direction to the length in the first axis (the X axis) direction may be greater than 0.5 and less than 1.

For example, the non-circular lens has a shape in which a portion of a circle is cut when viewed in the optical axis (the Z axis) direction.

Here, the first axis (the X axis) direction is a direction in which the longer side of the image sensor 410 extends, and the second axis direction (the Y axis) is a direction in which the shorter side of the image sensor 410 extends.

Referring to FIGS. 7A and 7B, in an example embodiment, a non-circular lens has a major axis and a minor axis. A line segment connecting both sides of the non-circular lens in the first axis (the X axis) direction, while passing through the optical axis (the Z axis), is the major axis, and a line segment connecting both sides of the non-circular lens in the second axis (the Y axis) direction, while passing through the optical axis (the Z axis), is the minor axis. The major axis and the minor axis are perpendicular to each other, and a length of the major axis is longer than a length of the minor axis.

In the embodiment illustrated in FIG. 7A, the non-circular lens has four side surfaces along the perimeter of the non-circular lens. When viewed in the optical axis direction, two of the four side surfaces have a generally linear shape, and the other two side surfaces have an arc shape.

The two side surfaces having a linear shape may be side surfaces extending in the first axis (X-axis) direction.

In the example embodiment illustrated in FIG. 7B, the side surface of the non-circular lens facing another lens in the second axis (the Y axis) direction has a linear shape when viewed in the optical axis (the Z axis) direction, and the rest has an arc shape.

For example, side surfaces of the plurality of lenses included in the rearmost lens array facing in the second axis (the Y axis) direction have a linear shape when viewed in the optical axis (the Z axis) direction, and the rest has an arc shape when viewed in the optical axis (the Z axis) direction.

In general, since the image sensor 410 is rectangular, not all light refracted by the circular lens is formed on the image sensor 410. Accordingly, by making the lens have a non-circular shape, the size of the lens may be reduced, without affecting image formation.

In addition, when a plurality of lenses included in the lens array each have a circular shape, there is a problem in that a distance between the lenses is increased.

However, in the present example embodiment, since the plurality of lenses included in the at least one lens array each have a non-circular planar shape, the plurality of optical axes may be disposed close to each other, without affecting image formation.

Meanwhile, since the non-circular lens has a major axis and a minor axis, the non-circular lens has a maximum diameter and a minimum diameter. Here, the maximum diameter of the non-circular lens is greater than a diameter of the circular lens.

That is, a lens having a relatively large diameter may have a non-circular planar shape.

Figure 8:
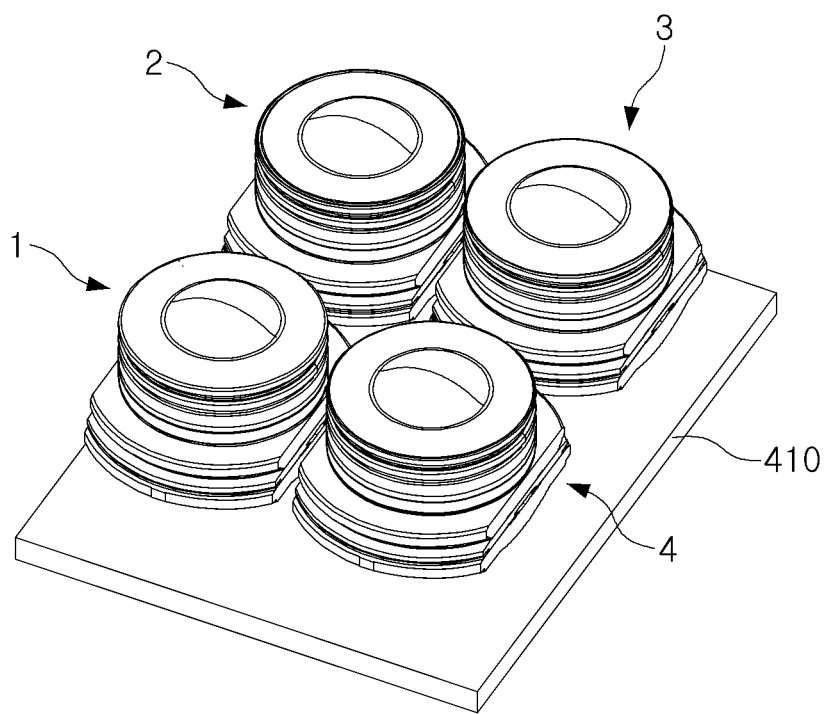
FIG. 8 is a schematic perspective view of a lens array and an image sensor of a camera module according to another example embodiment in the present disclosure.
Figure 9:
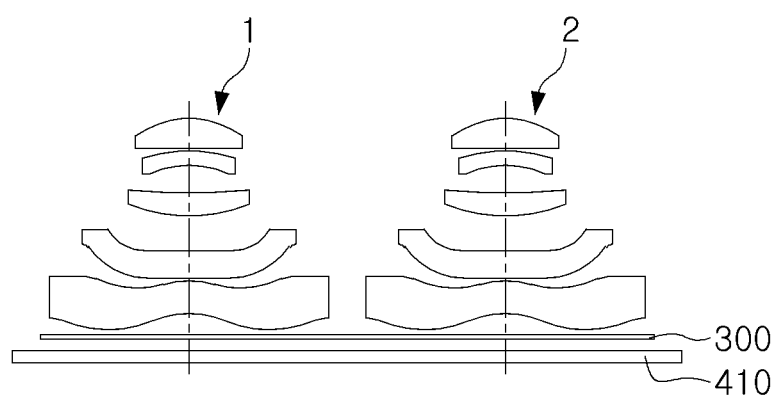
FIG. 9 is a schematic cross-sectional view of a lens array according to another example embodiment in the present disclosure.

FIG. 8 is a schematic perspective view of a lens array and an image sensor of a camera module according to another example embodiment in the present disclosure, and FIG. 9 is a schematic cross-sectional view of the lens array according to another example embodiment in the present disclosure.

The example embodiment illustrated in FIGS. 8 and 9 is the same as the example embodiment illustrated in FIG. 2 except for a configuration of a plurality of lens arrays.

For example, in the example embodiment illustrated in FIG. 2, the lens assembly 100 includes a plurality of lens arrays 110, and each of the lens arrays 111, 112, 113, 114, and 115 includes a plurality of lenses and, the plurality of lens arrays 110 include a plurality of optical axes.

However, in the example embodiment illustrated in FIGS. 8 and 9, the lens assembly 100 includes a plurality of lens modules 1, 2, 3 and 4 each having an optical axis. Optical axes of the respective lens modules 1, 2, 3, and 4 may be arranged in parallel.

The lens modules 1, 2, 3, and 4 may be accommodated in lens barrels, respectively, and the lens barrels may be disposed in one lens holder 130. Accordingly, the optical axes of the lenses may be aligned for each lens module 1, 2, 3, and 4, and thus, the plurality of optical axes of the lens assembly 100 may be easily aligned.

FIGS. 10A through 10D show various example embodiments of a non-circular lens applied to the example embodiments illustrated in FIGS. 8 and 9.

Among the plurality of lenses included in each lens module 1, 2, 3, and 4, the lenses disposed closest to the image side may be configured to have a non-circular planar shape.

For example, lenses disposed closest to the image side have a length in the first axis (X-axis) direction longer than a length in the second axis (Y-axis) direction.

Each of the non-circular lenses may include an optical portion 10 and a flange portion 30.

The optical portion 10 may be a portion in which optical performance of the non-circular lens is exhibited. For example, light reflected from a subject may pass through the optical portion 10 and be refracted.

The optical portion 10 may have refractive power and may have a surface having an aspherical shape.

The flange portion 30 may be configured to fix the non-circular lens to another component, for example, a lens barrel or another lens.

The flange portion 30 extends from the optical portion 10 and may be integrally formed with the optical portion 10.

The optical portion 10 is formed in a non-circular shape. For example, the optical portion 10 is non-circular when viewed from the optical axis (the Z axis) direction.

Figure 10A:
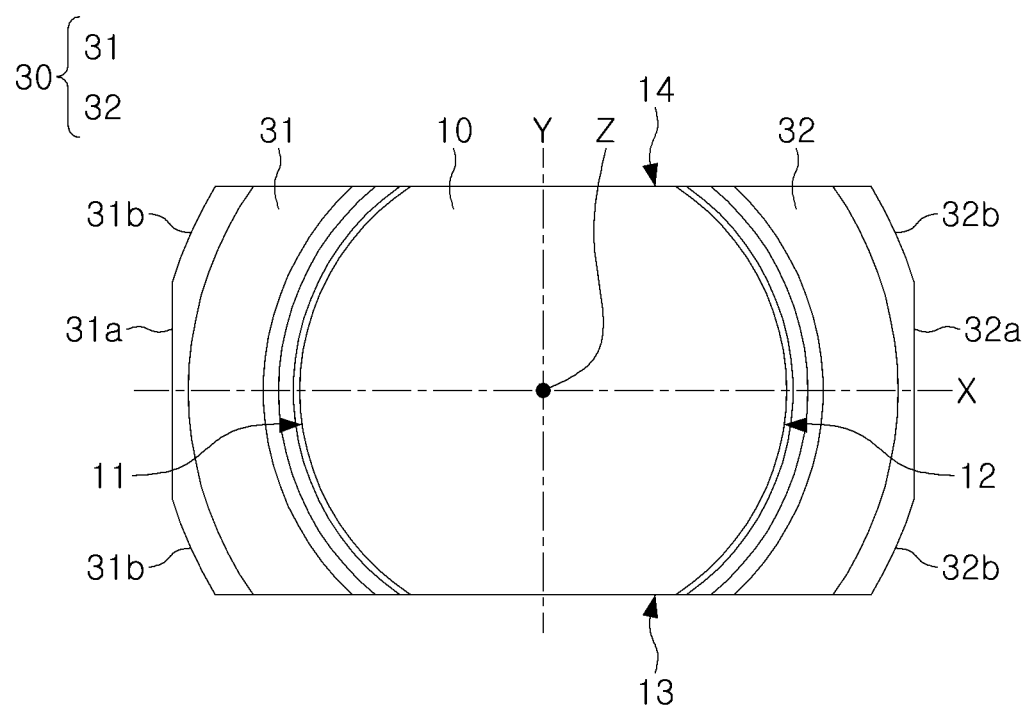
FIGS. 10A, 10B, 10C, and 10D show various example embodiments of a non-circular lens applied to the example embodiments illustrated in FIGS. 8 and 9.

Referring to FIG. 10A, in a plane perpendicular to the optical axis (the Z axis), the optical portion 10 has a length in the first axis (the X axis) direction perpendicular to the optical axis (the Z axis) longer than a length in the second axis (the Y axis) perpendicular to both the optical axis (the Z axis) and the first axis (the X axis) direction.

The optical portion 10 includes a first edge 11, a second edge 12, a third edge 13, and a fourth edge 14.

When viewed in the optical axis (the Z axis) direction, each of the first edge 11 and the second edge 12 has an arc shape.

The second edge 12 is provided on the opposite side of the first edge 11. In addition, the first edge 11 and the second edge 12 are positioned to face each other based on the optical axis (the Z axis).

The fourth edge 14 is provided on the opposite side of the third edge 13. In addition, the third edge 13 and the fourth edge 14 are positioned to face each other based on the optical axis (the Z axis).

The third edge 13 and the fourth edge 14 connect the first edge 11 and the second edge 12, respectively. The third edge 13 and the fourth edge 14 are symmetrical with respect to the optical axis (Z-axis) and may be formed parallel to each other.

When viewed in the optical axis (the Z axis) direction, the first edge 11 and the second edge 12 have an arc shape, and the third edge 13 and the fourth edge 14 have a generally linear shape.

The optical portion 10 has a major axis and a minor axis. A line segment connecting the third edge 13 and the fourth edge 14 by the shortest distance, while passing through the optical axis (the Z axis), is a minor axis, and a line segment connecting the first edge 11 and the second edge 12 and being perpendicular to the minor axis, while passing through the optical axis (the Z axis), is a major axis. A length of the major axis is longer than a length of the minor axis.

The flange portion 30 extends along a periphery of a portion of the optical portion 10 in the first axis (X-axis) direction. At least a portion of the flange portion 30 is in contact with an inner surface of the lens barrel.

The flange portion 30 includes a first flange portion 31 and a second flange portion 32. The first flange portion 31 extends from a first edge 11 of the optical portion 10, and the second flange portion 32 extends from a second edge 12 of the optical portion 10.

The first edge 11 of the optical portion 10 may refer to a portion adjacent to the first flange portion 31, and the second edge 12 of the optical portion 10 may refer to a portion adjacent to the second flange portion 32.

The third edge 13 of the optical portion 10 may refer to one side of the optical portion 10 on which the flange portion 30 is not formed, and the fourth edge 14 of the optical portion 10 may refer to the other side of the optical portion 10 on which the flange portion 30 is not formed.

A side surface of the first flange portion 31 includes a first flat portion 31a and a first curved portion 31b. The first flat portion 31a may refer to a side surface that meets a line extending the major axis of the optical portion 10. The first flat portion 31a may be flat.

The first curved portion 31b is disposed on both sides of the first flat portion 31a. The first curved portion 31b may be a surface in contact with the inner surface of the lens barrel and may be a curved surface.

The second flange portion 32 includes a second flat portion 32a and a second curved portion 32b. The second flat portion 32a may refer to a side surface that meets a line extending the major axis of the optical portion 10. The second flat portion 32a may be flat.

The second curved portion 32b is disposed on both sides of the second flat portion 32a. The second curved portion 32b may be a surface in contact with the inner surface of the lens barrel, and may be a curved surface.

Figure 10B:
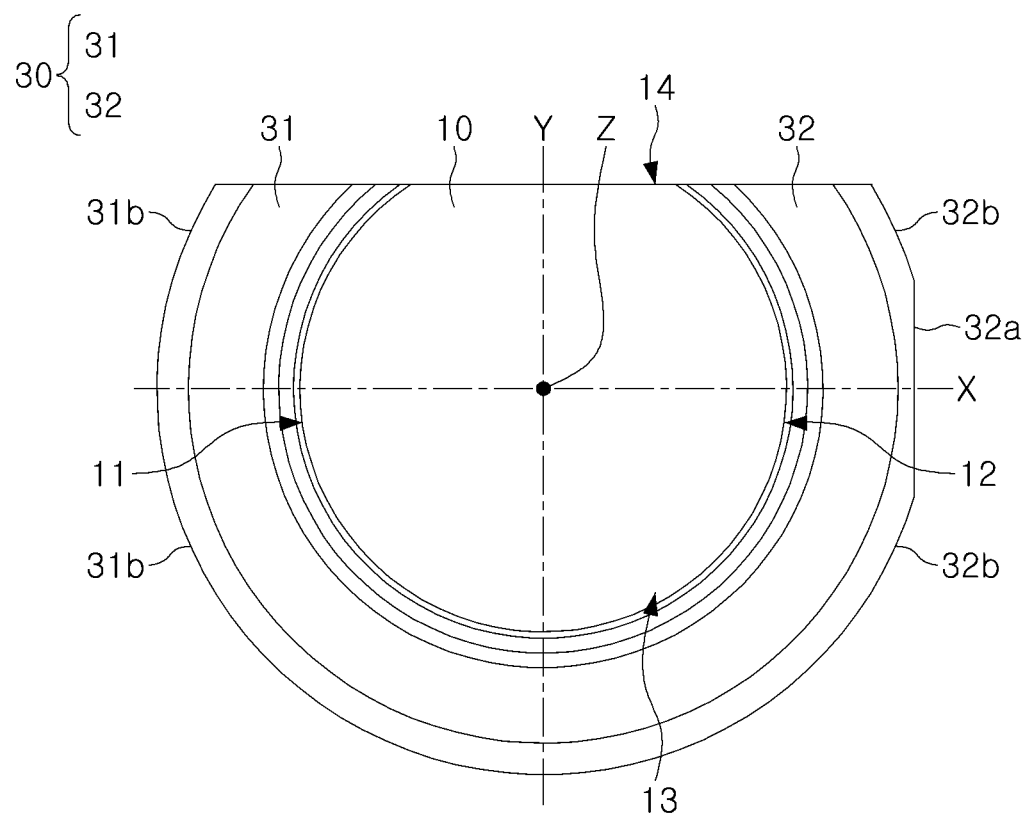
Figure 10C:
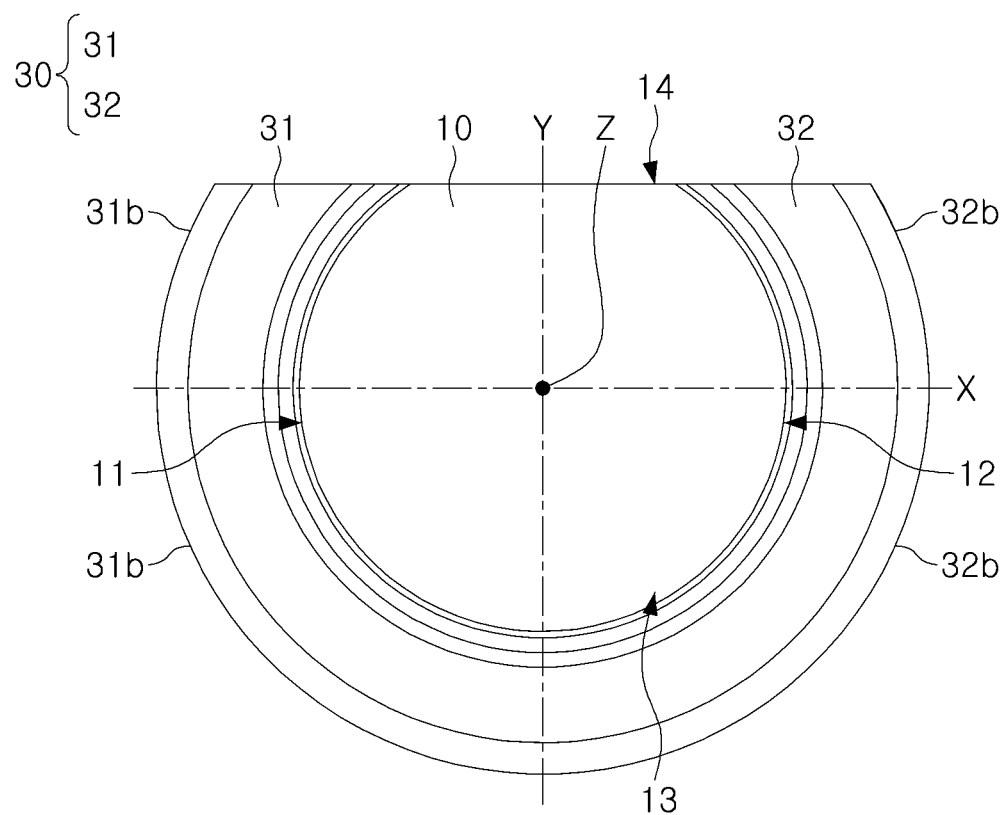
Figure 10D:
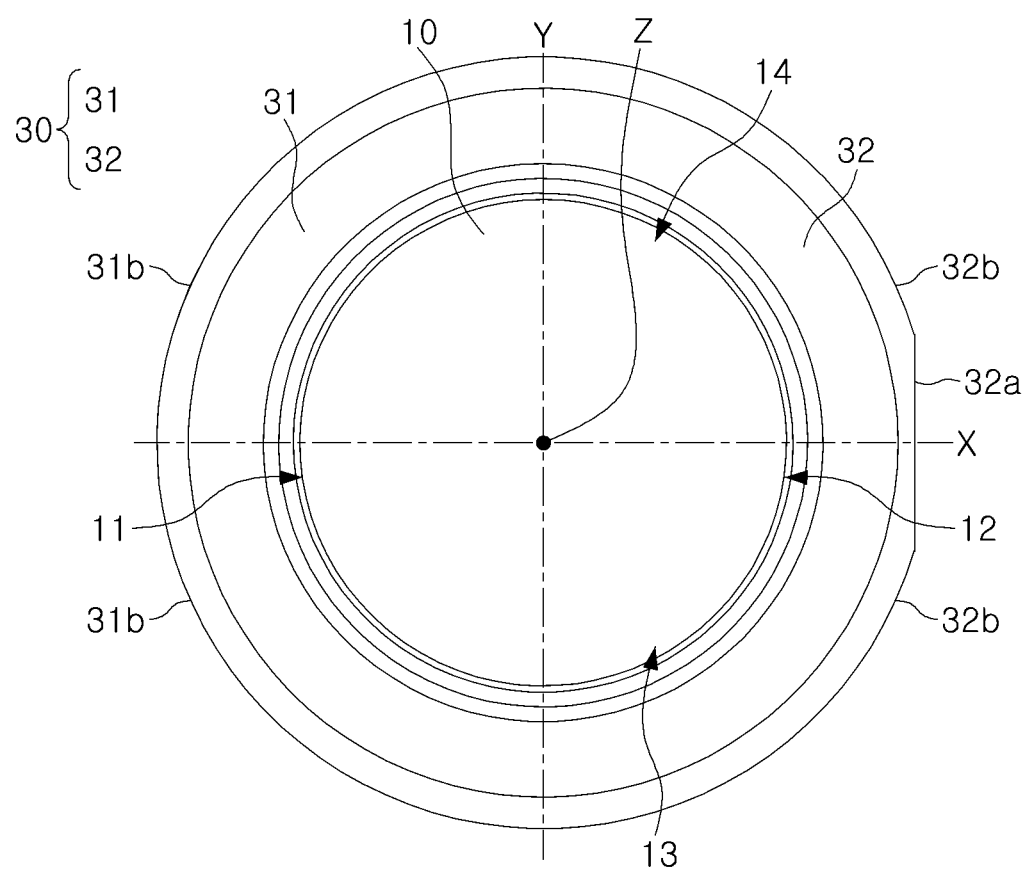

Referring to FIG. 10B through 10D, in the non-circular lens, at least a portion of a surface facing another lens disposed adjacent thereto has a linear shape when viewed in the optical axis (the Z axis) direction, and the rest has an arc shape.

For example, in the plurality of lenses, at least one of surfaces facing each other in the first axis (the X axis) direction and surfaces facing each other in the second axis (the Y axis) direction has a linear shape when viewed in the optical axis (the Z axis) and the other surface may have an arc shape when viewed in the optical axis direction.

Figure 11:
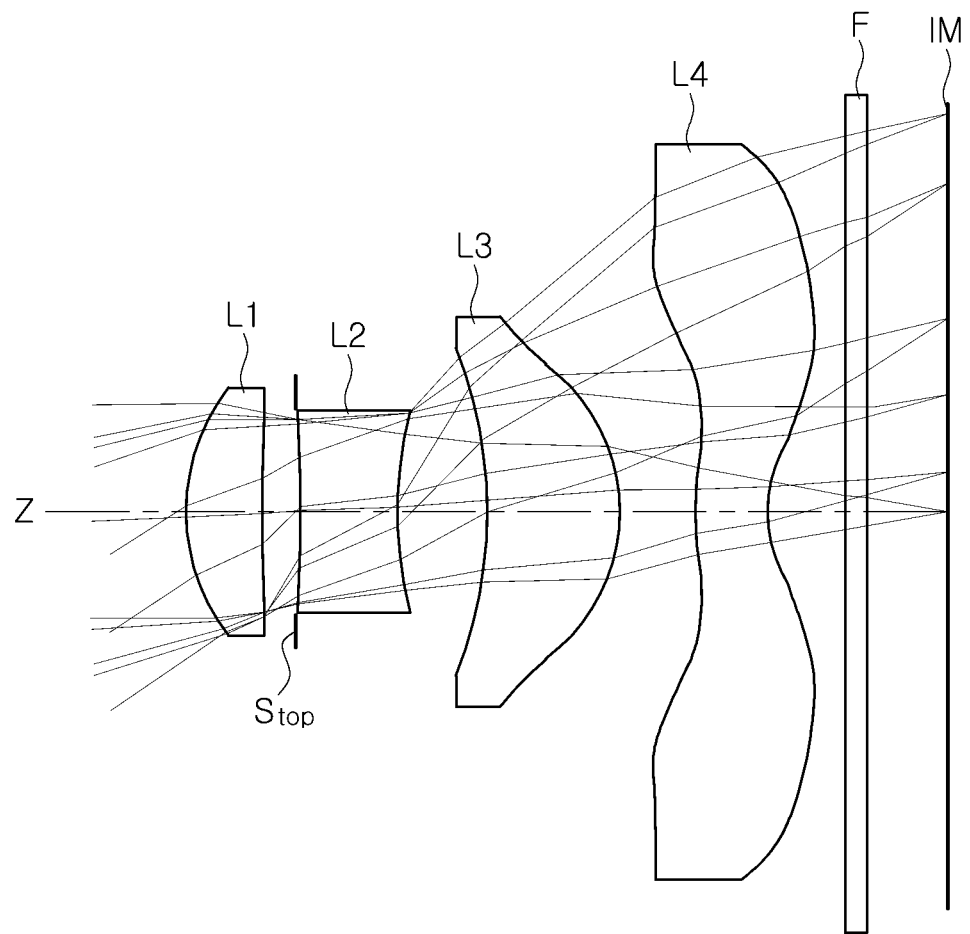
FIG. 11 is a block diagram of a lens module according to an example embodiment.
Figure 12:
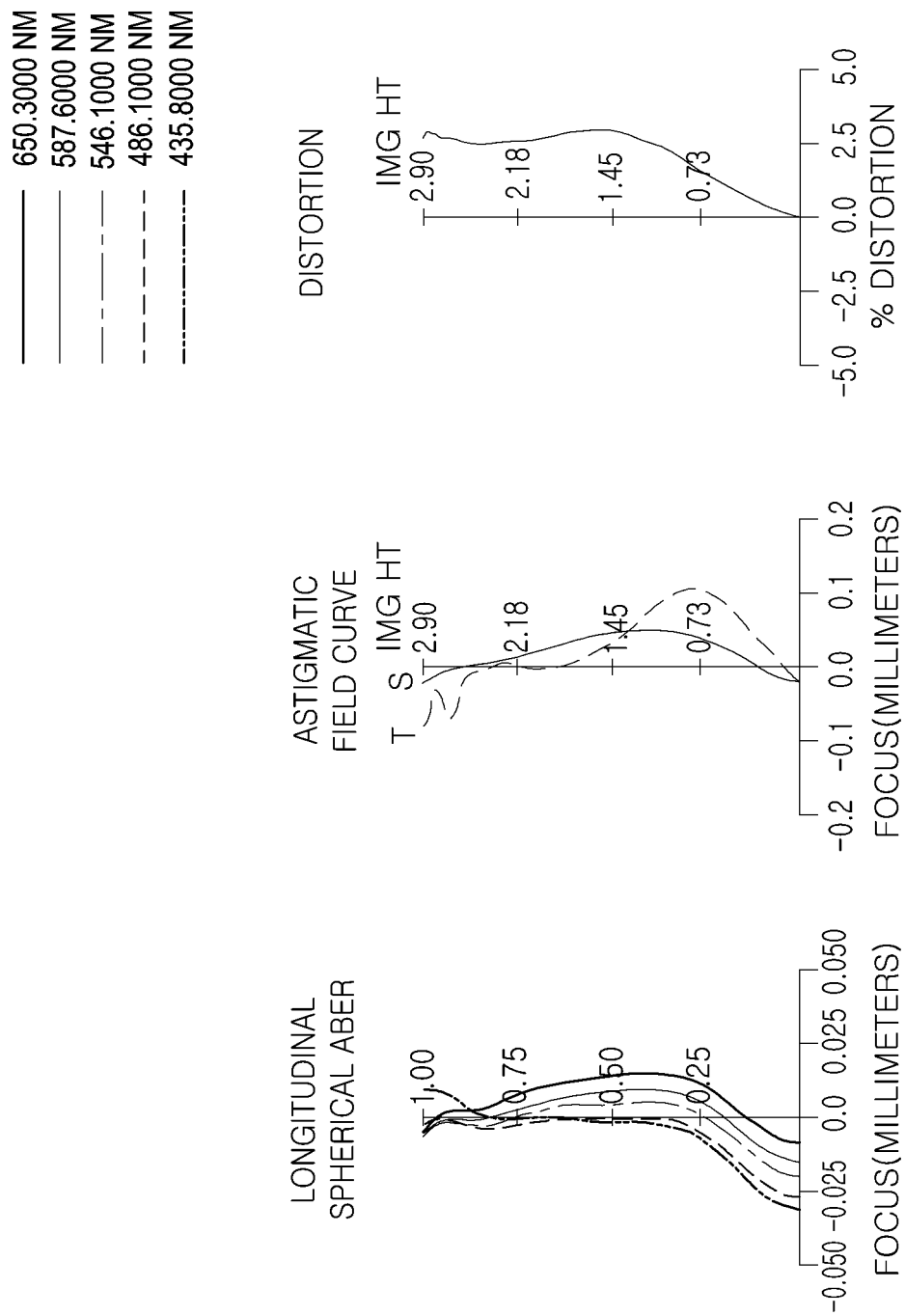
FIG. 12 is a view illustrating aberration characteristics of the lens module illustrated in FIG.
Figure 13:
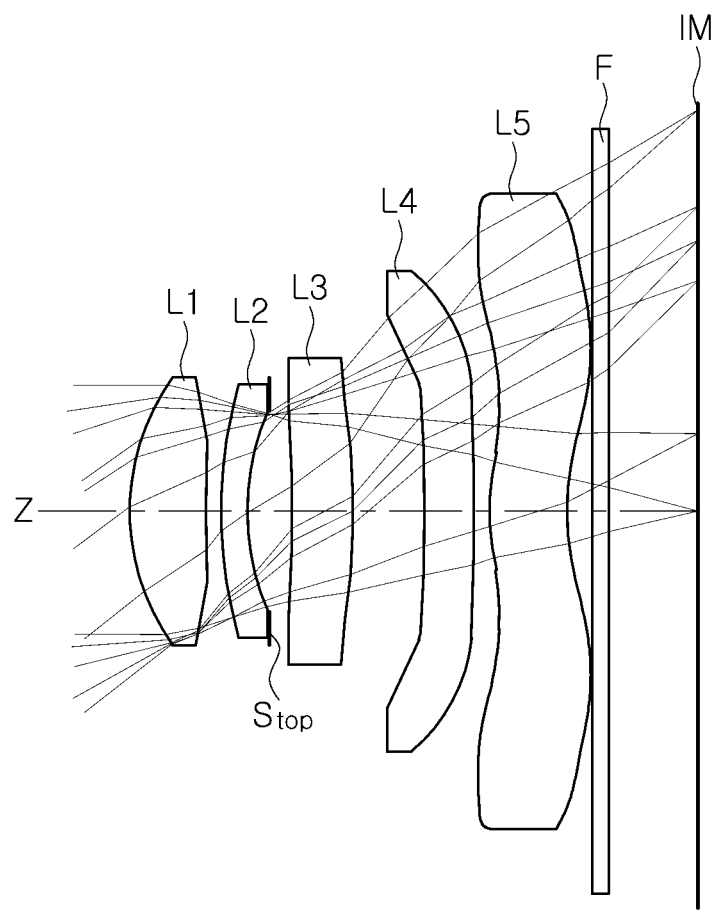
FIG. 13 is a block diagram of a lens module according to another example embodiment.
Figure 14:
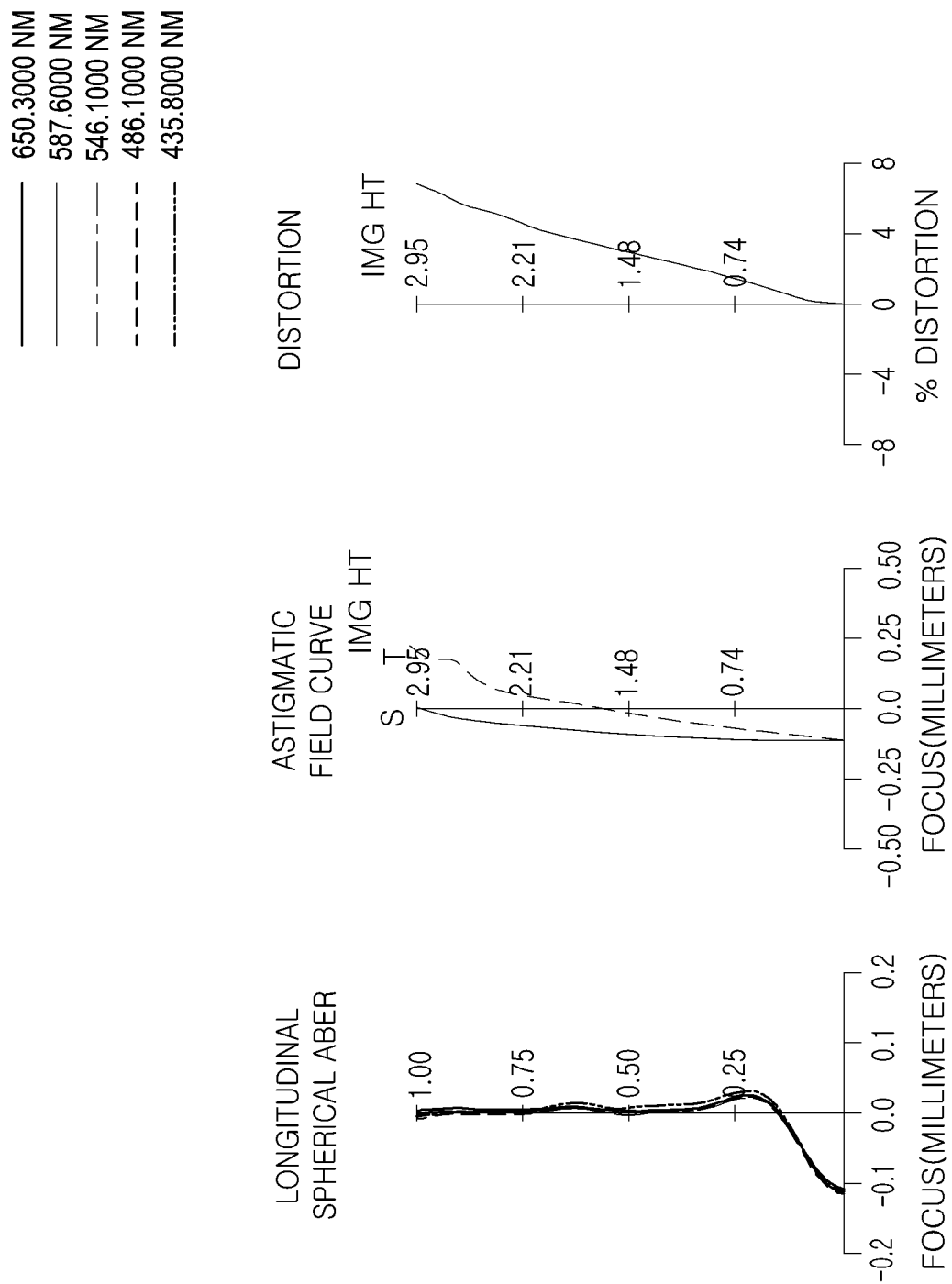
FIG. 14 is a view illustrating aberration characteristics of the lens module illustrated in FIG. 13.

FIG. 11 is a configuration diagram of a lens module according to an example embodiment, FIG. 12 is a diagram illustrating aberration characteristics of a lens module illustrated in FIG. 11, FIG. 13 is a configuration diagram of a lens module according to another example embodiment, and FIG. 14 is a view illustrating aberration characteristics of the lens module illustrated in FIG. 13.

The lens module described with reference to FIGS. 11 through 14 may be any one of the plurality of lens modules according to the example embodiments described above. In addition, all of the plurality of lens modules may have the same specification.

In the present disclosure, a first surface (or an object-side surface) of each lens refers to a surface close to an object side, and a second surface (or an image-side surface) refers to a surface close to an image side. In addition, all numerical values for a radius of curvature, thickness, distance, focal length, etc. of the lenses are in millimeter (mm), and the unit of field of view (FOV) is degree)(°.

In addition, in the description of the shape of each lens, a convex shape of one surface refers to that a paraxial region portion of a corresponding surface is convex, and a concave shape of one surface refers to that a paraxial region portion of a corresponding surface is concave. Therefore, even if one surface of the lens is described as having a convex shape, the edge portion of the lens may be concave. Similarly, although one surface of the lens is described as having a concave shape, the edge portion of the lens may be convex.

Meanwhile, the paraxial region refers to a very narrow region near the optical axis.

An imaging surface may refer to a virtual surface on which a focus is formed by the lens module. Alternatively, the imaging surface may refer to one surface of the image sensor on which light is received.

The lens module according to an example embodiment in the present disclosure includes four or five lenses.

For example, referring to FIG. 11, the lens module according to an example embodiment in the present disclosure includes a first lens L1, a second lens L2, a third lens L3, and a fourth lens L4 sequentially disposed from the object side. The first lens L1 to the fourth lens L4 are spaced apart from each other by a predetermined distance along the optical axis (the Z axis).

Also, referring to FIG. 13, the lens module according to an example embodiment in the present disclosure includes a first lens L1, a second lens L2, a third lens L3, a fourth lens L4, and a fifth lens L5 sequentially disposed from an object side. The first lens L1 to the fifth lens L5 are spaced apart from each other by a predetermined distance along the optical axis (the Z axis).

The lens module according to an example embodiment in the present disclosure does not include only four or five lenses, and may further include other components as needed.

For example, the lens module may further include an infrared filter (F, hereinafter referred to as a 'filter') for blocking infrared rays. The filter F is disposed between the rearmost lens and the imaging surface IM.

In addition, the lens module may further include a stop for adjusting the amount of light.

Meanwhile, at least one lens among the plurality of lenses constituting the lens module has an inflection point on at least one of an object-side surface and an image-side surface.

The inflection point refers to a point at which the surface of the lens changes from concave to convex or from convex to concave.

The plurality of lenses constituting the lens module are formed of a plastic material.

In addition, each of the first lens L1 to the third lens L3 may be formed of a plastic material having different optical properties from lenses disposed adjacent to each other.

In an example embodiment, a difference in Abbe's number between the first lens L1 and the second lens L2 may exceed 30. In addition, a difference in Abbe's number between the second lens L2 and the third lens L3 may exceed 30.

In an example embodiment, the second lens L2 may be formed of a plastic material having a high refractive index and a low dispersion value. For example, a refractive index of the second lens L2 may be greater than 1.65, and the Abbe's number of the second lens L2 may be less than 25.

In an example embodiment, the lens module satisfies the condition of $30<|v1-v2|<50$. $v1$ is the Abbe's number of the first lens L1, and $v2$ is the Abbe's number of the second lens L2.

In an example embodiment, the lens module satisfies the condition of $30<|v2-v3|<50$. $v2$ is the Abbe's number of the second lens L2, and $v3$ is the Abbe's number of the third lens L3.

A plurality of lenses constituting the lens module may have an aspherical surface. For example, each of the plurality of lenses may have at least one aspherical surface.

Here, the aspherical surface of each lens is expressed by Equation 1.

$$Z = \frac{cY^2}{1+\sqrt{1-(1+K)c^2Y^2}} + AY^4 + BY^6 + CY^8 + DY^{10} + EY^{12} + FY^{14} + GY^{16} + HY^{18} + JY^{20}...\quad \text{Equation 1}$$

In Equation 1, c is a curvature of the lens (the reciprocal of a radius of curvature), K is the conic constant, and Y is a distance from any point on the aspherical surface of the lens to the optical axis. In addition, constants A to H and J refer to aspheric coefficients. Z (SAG) represents a distance in an optical axis direction between any point on the aspherical surface of the lens and the vertex of the aspherical surface.

A lens module according to an example embodiment in the present disclosure will be described with reference to FIGS. 11 and 12.

The lens module according to an example embodiment in the present disclosure may include a first lens L1, a second lens L2, a third lens L3, and a fourth lens L4, and may further include a filter F and a stop.

The lens module according to an example embodiment in the present disclosure may form a focus on the imaging surface IM. The imaging surface IM may refer to a surface on which a focus is formed by the lens module. For example, the imaging surface IM may refer to one surface of the image sensor 410 on which light is received.

Lens characteristics (radius of curvature, thickness or distance between lenses, index, Abbe's number, focal length, and effective radius are illustrated in Table 1.

TABLE 1

| Surface No. | Remark | Radius of curvature | Thickness or distance | Refractive index | Abbe's number | Focal length | Effective radius |
|---|---|---|---|---|---|---|---|
| S1 | First lens | 1.6537 | 0.4683 | 1.546 | 56.114 | 3.3152 | 0.87 |
| S2 | | 17.2222 | 0.1101 | | | | 0.769377 |
| S3 | Stop | Infinity | 0.1123 | | | | 0.693 |
| S4 | Second lens | −39.7256 | 0.5926 | 1.669 | 20.353 | −6.2233 | 0.685 |
| S5 | | 4.6786 | 0.5421 | | | | 0.71 |
| S6 | Third lens | −5.3216 | 0.8000 | 1.546 | 56.114 | 3.3095 | 1.2 |
| S7 | | −1.4206 | 0.4613 | | | | 1.375578 |
| S8 | Fourth lens | 1.9282 | 0.4319 | 1.546 | 56.114 | −3.5565 | 2.282654 |
| S9 | | 0.8910 | 0.4720 | | | | 2.58 |

In an example embodiment in the present disclosure, the first lens L1 has a positive refractive power, a first surface of the first lens L1 is convex, and a second surface of the first lens L1 is concave.

The second lens L2 has a negative refractive power, and the first and second surfaces of the second lens L2 are concave.

The third lens L3 has a positive refractive power, a first surface of the third lens L3 is concave, and a second surface of the third lens L3 is convex in a paraxial region.

In addition, the third lens L3 has at least one inflection point on the second surface. For example, the second surface of the third lens L3 may be convex in the paraxial region and concave in a portion other than the paraxial region.

The fourth lens L4 has a negative refractive power, a first surface of the fourth lens L4 is convex in the paraxial region, and a second surface of the fourth lens L4 is concave in the paraxial region.

In addition, the fourth lens L4 has at least one inflection point on at least one of the first surface and the second surface. For example, the first surface of the fourth lens L4 may be convex in the paraxial region and concave in a portion other than the paraxial region. Also, the second surface of the fourth lens L4 may be concave in the paraxial region and convex in a portion other than the paraxial region.

Meanwhile, each surface of the first lens L1 to the fourth lens L4 has an aspherical coefficient as illustrated in Table 2. For example, both the object-side surface and the image-side surface of the first lens L1 to the fourth lens L4 are aspherical.

TABLE 2

| | S1 | S2 | S4 | S5 | S6 | S7 | S8 | S9 |
|---|---|---|---|---|---|---|---|---|
| Conic constant (K) | 1.654 | 17.222 | −39.726 | 4.679 | −5.322 | −1.421 | 1.928 | 0.891 |
| 4 times factor (A) | 3.102E−01 | −8.649E+01 | −3.665E+01 | −6.348E+01 | 1.855E+00 | −2.331E−01 | −2.810E+01 | −4.970E+00 |
| 6 times factor (B) | −2.538E−02 | −1.427E−01 | −4.776E−02 | 3.339E−01 | −9.025E−02 | −9.028E−02 | −2.545E−01 | −1.302E−01 |
| 8 times factor(C) | 4.272E−01 | 2.236E+00 | 7.416E−01 | −3.981E+00 | 5.977E−01 | 3.663E−01 | 1.412E−01 | 7.027E−02 |
| 10 times factor(D) | −3.270E+00 | −1.773E+01 | −6.693E+00 | 4.168E+01 | −2.920E+00 | −8.575E−01 | −7.557E−02 | −2.866E−02 |
| 12 times factor(E) | 1.420E+01 | 8.289E+01 | 3.328E+01 | −2.661E+02 | 7.999E+00 | 1.285E+00 | 5.086E−02 | 7.293E−03 |
| 14 times factor(F) | −3.776E+01 | −2.422E+02 | −1.018E+02 | 1.057E+03 | −1.352E+01 | −1.260E+00 | −2.462E−02 | −8.400E−04 |
| 16 times factor(G) | 6.242E+01 | 4.449E+02 | 1.915E+02 | −2.627E+03 | 1.447E+01 | 8.165E−01 | 7.230E−03 | −5.500E−05 |
| 18 times factor(H) | −6.255E+01 | −4.979E+02 | −2.145E+02 | 3.976E+03 | −9.533E+00 | −3.363E−01 | −1.250E−03 | 2.820E−05 |
| 20 times factor(J) | 3.473E+01 | 3.085E+02 | 1.300E+02 | −3.348E+03 | 3.525E+00 | 8.135E−02 | 1.170E−04 | −3.000E−06 |

In addition, the optical system configured as described above may have the aberration characteristic illustrated in FIG. 12.

A lens module according to another example embodiment in the present disclosure will be described with reference to FIGS. 13 and 14.

A lens module according to another example embodiment in the present disclosure may include a first lens L1, a second lens L2, a third lens L3, a fourth lens L4, and a fifth lens L5, and may further include a filter (F) and a stop.

The lens module according to another example embodiment in the present disclosure may form a focus on an imaging surface IM. The imaging surface IM may refer to a surface on which a focus is formed by the lens module. For example, the imaging surface IM may refer to one surface of the image sensor 410 on which light is received.

Lens characteristics of each lens (radius of curvature, thickness or distance between lenses, index, Abbe's number, focal length, effective radius) are illustrated in Table 3.

The third lens L3 has a positive refractive power, a first surface of the third lens L3 is concave, and a second surface of the third lens L3 is convex in the paraxial region.

In addition, the third lens L3 has at least one inflection point on the second surface. For example, the second surface of the third lens L3 may be convex in the paraxial region and concave in a portion other than the paraxial region.

The fourth lens L4 has a negative refractive power, and the first and second surfaces of the fourth lens L4 are concave in the paraxial region.

In addition, the fourth lens L4 has at least one inflection point on the second surface. For example, the second surface of the fourth lens L4 may be concave in the paraxial region and convex in a portion other than the paraxial region.

The fifth lens L5 has positive refractive power, a first surface of the fifth lens L5 is convex in the paraxial region, and a second surface of the fifth lens L5 is concave in the paraxial region.

Also, the fifth lens L5 has at least one inflection point on the first surface and the second surface. For example, the

TABLE 3

| Surface No. | Remark | Radius of curvature | Thickness or distance | Refractive index | Abbe's number | Focal length | Effective radius |
|---|---|---|---|---|---|---|---|
| S1 | First lens | 1.4931 | 0.6161 | 1.546 | 55.9 | 2.7663 | 0.995 |
| S2 | | 111.5397 | 0.1 | | | | 0.924416 |
| S3 | Second lens | 3.05 | 0.1999 | 1.668 | 20.4 | −5.4205 | 0.83 |
| S4 | | 1.6121 | 0.1924 | | | | 0.73 |
| S5 | Stop | Infinity | 0.1437 | | | | 0.74846 |
| S6 | Third lens | −43.7373 | 0.4807 | 1.546 | 55.9 | 22.2635 | 0.828749 |
| S7 | | −9.5491 | 0.5452 | | | | 1.01 |
| S8 | Fourth lens | −129.9230 | 0.4224 | 1.668 | 20.4 | −15.4001 | 1.42 |
| S9 | | 11.1864 | 0.1443 | | | | 1.656817 |
| S10 | Fifth lens | 1.3404 | 0.5745 | 1.537 | 55.7 | 24.3341 | 2.1 |
| S11 | | 1.2700 | 0.2168 | | | | 2.363082 |

In another example embodiment in the present disclosure, the first lens L1 has a positive refractive power, a first surface of the first lens L1 is convex, and a second surface of the first lens L1 is concave.

The second lens L2 has a negative refractive power, a first surface of the second lens L2 is convex, and a second surface of the second lens L2 is concave.

first surface of the fifth lens L5 may be convex in the paraxial region and concave in a portion other than the paraxial region. The second surface of the fifth lens L5 may be concave in the paraxial region and convex in a portion other than the paraxial region.

Meanwhile, each surface of the first lens L1 to the fifth lens L5 has an aspherical coefficient as illustrated in Table 4. For example, both the object-side surface and the image-side surface of the first lens L1 to the fifth lens L5 are aspherical.

TABLE 4

|  | S1 | S2 | S3 | S4 | S6 |
|---|---|---|---|---|---|
| Conic constant (K) | 1.493 | 111.540 | 3.046 | 1.612 | −43.737 |
| 4 times factor(A) | −2.619E−01 | 0.000E+00 | −1.540E+01 | −1.118E+00 | 9.900E+01 |
| 6 times factor(B) | 5.130E−02 | −1.380E−02 | −2.358E−01 | 3.960E−02 | −3.365E−01 |
| 8 times factor(C) | −5.699E−01 | −7.698E−01 | 1.190E+00 | −4.561E+00 | 3.533E+00 |
| 10 times factor(D) | 3.491E+00 | 6.938E+00 | −4.256E+00 | 5.733E+01 | −2.965E+01 |
| 12 times factor(E) | −1.262E+01 | −2.978E+01 | 1.337E+01 | −3.821E+02 | 1.500E+02 |
| 14 times factor(F) | 2.797E+01 | 7.530E+01 | −2.972E+01 | 1.566E+03 | −4.718E+02 |
| 16 times factor(G) | −3.862E+01 | −1.176E+02 | 4.189E+01 | −4.023E+03 | 9.327E+02 |
| 18 times factor(H) | 3.234E+01 | 1.115E+02 | −3.421E+01 | 6.314E+03 | −1.126E+03 |
| 20 times factor(J) | −1.503E+01 | −5.887E+01 | 1.380E+01 | −5.528E+03 | 7.576E+02 |

|  | S7 | S8 | S9 | S10 | S11 |
|---|---|---|---|---|---|
| Conic constant (K) | −9.549 | −129.923 | 11.186 | 1.340 | 1.270 |
| 4 times factor(A) | −9.209E+01 | 5.000E+01 | 3.407E+01 | −1.873E+00 | −1.006E+00 |
| 6 times factor(B) | −5.820E−02 | 2.279E−01 | −5.270E−02 | −5.548E−01 | −3.215E−01 |
| 8 times factor(C) | −1.399E−01 | −9.612E−01 | −3.096E−01 | 6.136E−01 | 1.553E−01 |
| 10 times factor(D) | 4.757E−01 | 2.490E+00 | 1.196E+00 | −5.421E−01 | −2.740E−02 |
| 12 times factor(E) | −8.828E−01 | −4.470E+00 | −2.051E+00 | 3.234E−01 | −2.270E−02 |
| 14 times factor(F) | 1.050E+00 | 5.124E+00 | 1.920E+00 | −1.204E−01 | 1.820E−02 |
| 16 times factor(G) | −4.991E−01 | −3.720E+00 | −1.060E+00 | 2.730E−02 | −6.000E−03 |
| 18 times factor(H) | −2.307E−01 | 1.649E+00 | 3.459E−01 | −3.600E−03 | 1.000E−03 |
| 20 times factor(J) | 3.861E−01 | −4.048E−01 | −6.160E−02 | 2.000E−04 | −1.000E−04 |

In addition, the optical system configured as described above may have the aberration characteristics illustrated in FIG. 14.

Figure 15:
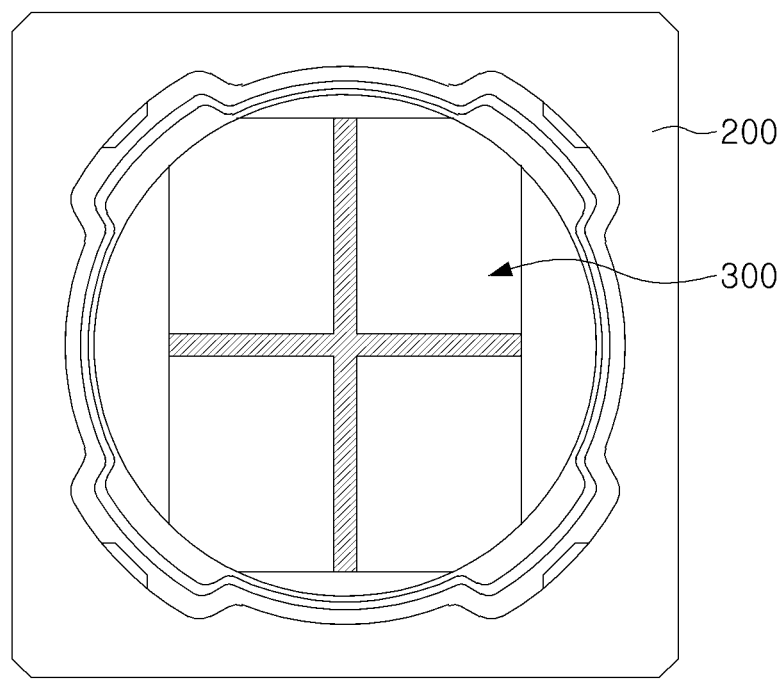
FIG. 15 is a plan view of a camera module according to an example embodiment in the present disclosure except for a lens assembly.
Figure 16:
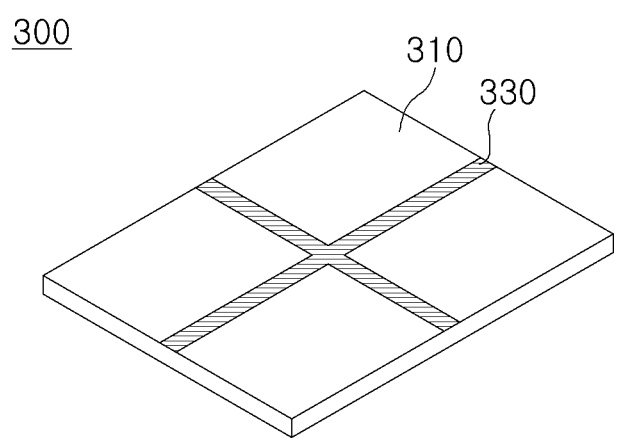
FIG. 16 is a perspective view of an infrared cut-off filter provided in a camera module according to an example embodiment in the present disclosure.

FIG. 15 is a plan view of a camera module according to an example embodiment in the present disclosure except for a lens assembly, and FIG. 16 is a perspective view of an infrared cut-off filter provided in a camera module according to an example embodiment in the present disclosure In the camera module according to an example embodiment in the present disclosure, a plurality of lens modules divide an effective imaging area of a single image sensor 410 to capture an image of a subject, and the captured images are synthesized to generate one complete image.

In addition, since each lens module is disposed close to each other, light passing through one lens module may affect an imaging area of an adjacent lens module, and image quality of the image captured by each lens module may be deteriorated by such unnecessary light.

Therefore, the camera module according to an example embodiment in the present disclosure includes a light blocking portion 330 in the infrared cut-off filter 300 to prevent the light passing through one lens module from affecting an imaging area of a neighboring lens module.

Like the image sensor 410, the infrared cut-off filter 300 is provided as a single infrared cut-off filter 300.

That is, instead of providing a plurality of infrared cut-off filters corresponding to each lens module, a single infrared cut-off filter 300 is provided.

The light blocking portion 330 may be a light absorbing layer that blocks unnecessary light from light incident on the infrared cut-off filter 300. The light absorbing layer may be black.

The light blocking portion 330 may be disposed on at least one of an upper surface 310 (a surface facing the lens assembly) and a lower surface (a surface facing the image sensor) of the infrared cut-off filter 300.

The infrared cut-off filter 300 may be divided into a plurality of regions by the light blocking portion 330. For example, when a plurality of lenses are disposed in each lens array in an N×N matrix structure, the light blocking portion 330 may be disposed to extend in a direction orthogonal to each other from the center of the infrared cut-off filter 300. Accordingly, the infrared cut-off filter 300 may be divided into four regions.

Since the infrared cut-off filter 300 is disposed close to the image sensor 410, light passing through each lens module may be effectively prevented from being incident on an imaging area of a neighboring lens module by forming the light blocking portion 330 in the infrared cut-off filter 300.

As set forth above, according to example embodiments of the present disclosure, the lens assembly and the camera module including the same according to an example embodiment in the present disclosure may be reduced in size, while capturing a high-resolution image or video.

While specific example embodiments have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens assembly comprising:
a plurality of lens arrays sequentially disposed from an object side toward an image side,
wherein each lens array comprises a plurality of lenses, and
wherein a plurality of lenses included in a lens array of the plurality of lens arrays disposed to be closest to the image side have a length in a first axis direction, perpendicular to an optical axis, longer than a length in a second axis direction, perpendicular to both the optical axis and the first axis direction,
wherein the plurality of lens arrays comprise a first lens array and a second lens array,
wherein a protrusion is disposed in any one of the first lens array and the second lens array and a recess is disposed in the other thereof, and
wherein the protrusion and the recess are in contact with each other to be coupled.

2. The lens assembly of claim 1, wherein
a surface in which the protrusion and the recess face each other in a direction perpendicular to the optical axis is an inclined curved surface.

3. The lens assembly of claim 2, wherein
the protrusion has a truncated cone shape.

4. The lens assembly of claim 2, wherein
the protrusion and the recess are gradually reduced in diameter in a direction from the protrusion to the recess.

5. The lens assembly of claim 2, wherein
a height of the protrusion is greater than a depth of the recess.

6. The lens assembly of claim 1, wherein
the protrusion and the recess are each positioned in a region surrounded by the plurality of lenses.

7. The lens assembly of claim 1, wherein,
in the plurality of lenses included in the lens array disposed closest to the image side, side surfaces facing each other in the second axis direction have a linear shape when viewed in an optical axis direction.

8. The lens assembly of claim 1, wherein,
in the plurality of lenses included in the lens array disposed closest to the image side, a ratio of a length in the second axis direction to a length in the first axis direction is greater than 0.5 and less than 1.

9. The lens assembly of claim 1, wherein,
in a plurality of lenses included in a lens array of the plurality of lens arrays, disposed to be adjacent to the lens array disposed closest to the image side, a length in the first axis direction is longer than a length in the second axis direction.

10. The lens assembly of claim 1, wherein,
in a plurality of lenses included in a lens array of the plurality of lens arrays, disposed closest to the object side, an object-side surface is convex.

11. The lens assembly of claim 10, wherein
the plurality of lenses included in the lens array disposed closest to the object side have a positive refractive power.

12. A camera module comprising:
a plurality of lens modules each comprising a plurality of lenses and disposed to be adjacent to each other;
a housing accommodating the plurality of lens modules; and
an image sensor module coupled to the housing and having a single image sensor,
wherein the image sensor has a longer side extending in a first axis direction, perpendicular to an optical axis, and a shorter side extending in a second axis direction, perpendicular to both the optical axis and the first axis direction, and
wherein lenses disposed to be closest to an image side, among the plurality of lenses included in each lens module, have a length in the first axis direction longer than a length in the second axis direction.

13. The camera module of claim 12, wherein
the lenses disposed closest to the image side comprise at least one of side surfaces facing each other in the first axis direction and the second axis direction having a linear shape when viewed in an optical axis direction.

14. The camera module of claim 12, wherein
the lenses disposed closest to the image side comprise an optical portion and a flange portion extending from the optical portion, and
the optical portion comprises a first edge having an arc shape, a second edge provided on the opposite side from the first edge based on the optical axis and having an arc shape, and third and fourth edges connecting the first edge and the second edge, when viewed in an optical axis direction.

15. The camera module of claim 14, wherein
at least one of the third edge and the fourth edge has a linear shape when viewed in the optical axis direction.

16. The camera module of claim 12, wherein
lenses, among the plurality of lenses included in each lens module, disposed to face the lenses disposed closest to the image side, comprise a length in the first axis direction longer than a length in the second axis direction.

17. The camera module of claim 12, further comprising:
a single infrared cut-off filter disposed between the plurality of lens modules and the image sensor,
wherein the infrared cut-off filter comprises a light blocking portion disposed on at least one of a surface facing the lens module and a surface facing the image sensor, and
wherein the light blocking portion divides the infrared cut-off filter into a plurality of regions to correspond to the number of the plurality of lens barrels.

18. A camera module comprising:
an array of a plurality of lens modules,
wherein each lens module comprises lenses sequentially disposed from an object side toward an image side,
wherein an image side most lens of each lens module comprises a length in a first axis direction, perpendicular to an optical axis, longer than a length in a second axis direction, perpendicular to both the optical axis and the first axis direction, wherein the plurality of lens arrays comprise a first lens array and a second lens array, wherein a protrusion is disposed in the first lens array or the second lens array and a recess is disposed in the other thereof, and wherein the protrusion and the recess are in contact with each other to be coupled.

19. The camera module of claim 18, wherein the array of the plurality of lens modules comprises a plurality of lens arrays sequentially disposed from an object side toward an image side, wherein the lenses are disposed in the plurality of lens arrays, and wherein the image side most lenses are disposed in an image side most lens array of the plurality of lens arrays.

20. A camera module comprising:

an array of a plurality of lens modules, wherein each lens module comprises lenses sequentially disposed from an object side toward an image side, wherein an image side most lens of each lens module comprises a length in a first axis direction, perpendicular to an optical axis, longer than a length in a second axis direction, perpendicular to both the optical axis and the first axis direction, wherein each lens module of the array of the plurality of lens modules comprises a lens barrel, and wherein the lenses of each lens module are disposed in a respective lens barrel.

21. The camera module of claim 20, further comprising:

a housing accommodating the array of the plurality of lens modules; and an image sensor module coupled to the housing and having a single image sensor, wherein the image sensor has a longer side extending in the first axis direction, and a shorter side extending in the second axis direction.

22. The camera module of claim 18, wherein one or more of the lenses disposed on the object side of the image side most lens of each lens module comprises a length in the first axis direction longer than a length in the second axis direction.

* * * * *